United States Patent
Bedak et al.

(10) Patent No.: US 9,174,608 B2
(45) Date of Patent: Nov. 3, 2015

(54) SEATBELT SYSTEM HAVING A FORCE LIMITER

(75) Inventors: Nizam Bedak, Schwaebisch Gmuend (DE); Joachim Biller, Lorch (DE); Michael Folter, Alfdorf (DE); Helmut Schuster, Alfdorf (DE); Susanne Schuster, legal representative, Alfdorf (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 576 days.

(21) Appl. No.: 13/510,083

(22) PCT Filed: Dec. 9, 2010

(86) PCT No.: PCT/EP2010/007488
§ 371 (c)(1),
(2), (4) Date: Jun. 7, 2012

(87) PCT Pub. No.: WO2011/082757
PCT Pub. Date: Jul. 14, 2011

(65) Prior Publication Data
US 2012/0273601 A1 Nov. 1, 2012

(30) Foreign Application Priority Data
Dec. 14, 2009 (DE) .......................... 10 2009 058 064

(51) Int. Cl.
*B60R 22/46* (2006.01)
*B60R 22/28* (2006.01)

(52) U.S. Cl.
CPC ....... *B60R 22/4676* (2013.01); *B60R 2022/283* (2013.01); *B60R 2022/288* (2013.01); *B60R 2022/289* (2013.01)

(58) Field of Classification Search
USPC ........................................ 242/379.1
See application file for complete search history.

(56) References Cited

U.S. PATENT DOCUMENTS

| | | | | |
|---|---|---|---|---|
| 3,952,967 | A  * | 4/1976 | Barile et al. | 242/379.1 |
| 5,836,534 | A  * | 11/1998 | Bohmler | 242/379.1 |
| 6,206,315 | B1 * | 3/2001 | Wier | 242/379.1 |
| 6,343,759 | B1 * | 2/2002 | Specht | 242/375.1 |
| 2004/0021027 | A1 * | 2/2004 | Kohlndorfer et al. | 242/379.1 |
| 2004/0031872 | A1 | 2/2004 | Schmid | |
| 2008/0017743 | A1 * | 1/2008 | Hiramatsu et al. | 242/379.1 |
| 2008/0054616 | A1 * | 3/2008 | Rogers | 280/805 |
| 2008/0061180 | A1 * | 3/2008 | Webber et al. | 242/379.1 |
| 2009/0267339 | A1 * | 10/2009 | Usoro et al. | 280/807 |
| 2009/0277986 | A1 * | 11/2009 | Cordes et al. | 242/379 |
| 2014/0097593 | A1 * | 4/2014 | Battlogg et al. | 280/283 |

FOREIGN PATENT DOCUMENTS

| | | |
|---|---|---|
| DE | 102 31 079 | 5/2003 |
| DE | 103 37 252 | 2/2004 |
| DE | 10 2004 032 172 | 1/2006 |
| DE | 10 2007 029 676 | 1/2009 |
| DE | 10 2008 024 623 | 11/2009 |

* cited by examiner

*Primary Examiner* — Emmanuel M Marcelo
*Assistant Examiner* — Angela Caligiuri
(74) *Attorney, Agent, or Firm* — Tarolli, Sundheim, Covell & Tummino LLP

(57) ABSTRACT

A belt retractor including a force limiter comprises a belt reel which is rotatably supported in a frame as well as a blocking unit counteracting a rotation of the belt reel and a force limiter between the belt reel and the blocking unit which permits a limited torsion of the belt reel against the blocking unit under load. The force limiter includes a damping element consisting of a cross-linked polymer which is sheared under load.

14 Claims, 3 Drawing Sheets

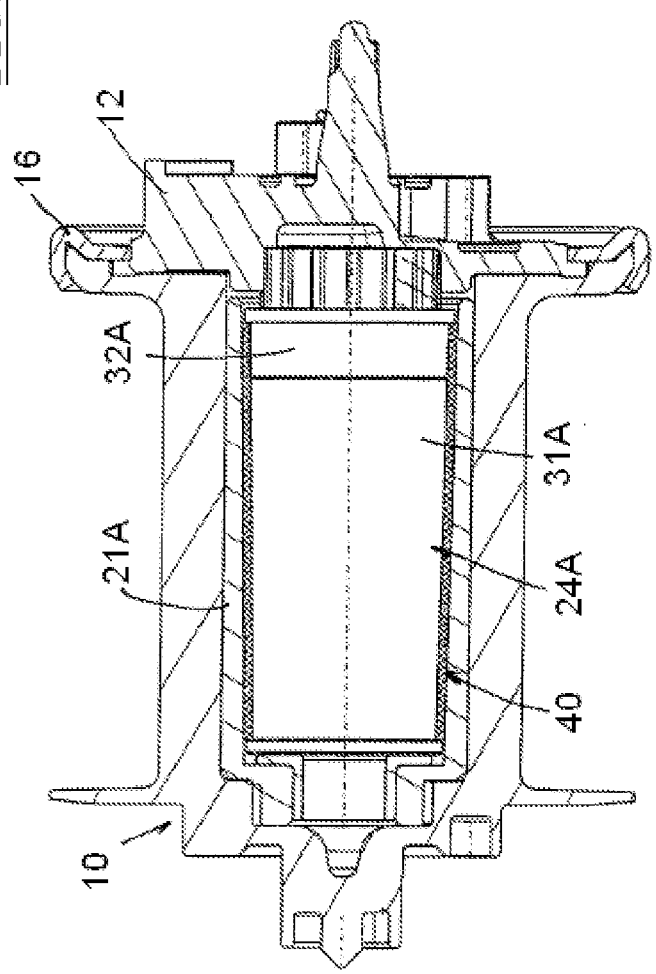

SEATBELT SYSTEM HAVING A FORCE LIMITER

RELATED APPLICATIONS

This application corresponds to PCT/EP2010/007488, filed Dec. 9, 2010, which claims the benefit of German Application No. 10 2009 058 064.6, filed Dec. 14, 2009, the subject matter, of which are incorporated herein by reference in their entirety.

BACKGROUND OF THE INVENTION

The invention relates to a seatbelt system including a force limiter comprising a rotatably supported belt reel, comprising a blocking unit counteracting rotation of the belt reel and comprising a force limiter permitting a restricted torsion of the belt reel against the blocking unit under load, wherein the force limiter includes a damping element.

From DE 103 37 252 the basic structure of a belt retractor is known as it is used in a plurality of applications in automotive vehicles. The belt retractor includes a rotatably supported belt reel and a blocking unit counteracting a movement of rotation of the belt reel in the actuated state. In order to admit a limited belt strap extension under load in the case of blocking, said belt retractor is provided with a force limiter. Said force limiter usually is in the form of a torsion rod connected on one side to the belt reel in a torque-proof manner and on the other side to the blocking unit in a torque-proof manner. If the blocking unit is fixedly held at the retractor frame by locking, for instance, a belt strap pull-off force acting on the belt reel results in a torsion of the torsion rod. In this way, a limited torsion is admitted between the belt reel and the blocking unit, and the holding force acting on the belt strap and the vehicle occupant, respectively, is limited.

From DE 102 31 079 A1 a rotational damper or force limiter for a belt reel is known in which a damping medium is arranged in a working chamber. In the load case, in the damping medium convection is generated through blades at a shaft. In this case a highly viscous fluid, especially a silicone, is used as damping medium.

Such damping and force limiting system, respectively, has the drawback of a relatively complex structure requiring available space. In particular the necessary sealing and the blades necessary for generating the convection require considerable constructional efforts and additional available space.

SUMMARY OF THE INVENTION

Compared to this, the object underlying the invention is to improve a belt retractor including a force limiter to the effect that an as simple construction as possible is feasible and at the same time the available space required for force limitation is small. Furthermore, the force limitation is intended to be effective already at an early period of time and over a large angle of rotation.

This object is achieved by a belt retractor of the type mentioned in the beginning in which the damping element consists of a cross-linked polymer which is sheared under load.

The use of a cross-linked polymer as damping element sheared under load has the advantage that by the shearing operation a great damping action and a high restraining force, resp., is generated already at the beginning of force limitation at relatively low belt strap extension rates. At the same time, the components of the force limiter can be structured in a simple and compact manner and thus allow a compact and weight-optimized belt retractor. The use of a cross-linked polymer reduces especially the efforts for sealing the system and is thus suited for a maintenance-free use over a very long period of time. The damping and force limiting characteristics of such belt retractor can be easily obtained by modifying the cross-linked polymer without the further components of the force limiter or belt retractor having to be varied as to their construction and their dimensions, respectively.

Such force limiter is suited especially well for belt retractors including tensioning drives in which the tensioning movement is introduced to the belt reel through the force limiter. In these cases a relatively high tensioning force can be introduced compared to torsion rods.

An especially space-saving and compact belt retractor is made possible by the fact that the damping element is arranged in an annular space inside the belt reel. In this way it can be ensured that the belt retractor does without additional mounted parts or a lengthening piece in axial direction and thus the required available space is not enlarged compared to conventional retractors including torsion rods.

Complex sealing measures can be completely dispensed with, when the damping element is provided within a temperature range between −35° C. and +85° C. as elastic flexible solid or elastomer.

Cross-linked silicones have turned out to be an especially suited material for the use in such belt retractor. These silicone materials are known as to their basic structure and their composition in a plurality of applications without being employed as damping element sheared under load in the cross-linked state, however.

The properties of the damping element can be adapted to different force limiting load cases and curve progressions in a simple and advantageous manner by the selection of the polymer and by the adaptation by means of admixture of additives. As additives in this case mainly solids, fibers or particles are suited. Further advantages are offered by the admixture of fillers or additives having variable properties, e.g. electrorheological or magneto-rheological substances or substances and particles, resp., the properties of which vary upon mechanical load. The variable properties thereof can then be combined with the basic properties of the carrier substance by the control or activation known per se.

An especially simple construction of a belt retractor is made possible in that the annular space is formed for receiving the damping element through the inner wall of the hollow belt reel, on the one hand, and the outer wall of a shaft connected to the blocking unit.

Especially when the peripheral walls of the annular space are designed to have smooth surfaces, the fabrication or manufacturing efforts for such force limiter and belt retractor, respectively, are low. With such arrangement the shearing of the damping element can be carried out over the entire periphery.

The adhesion of the damping element to the components moving relative to each other and the friction forces to be applied, resp., are increased, when the damping element is biased. This can be carried out either by axial clamping during assembly already or by mechanical reduction of volume and/or length of the receiving annular space immediately before the load case occurs.

The manufacture and assembly of such belt retractor is facilitated by the fact that the damping element is provided in the form of a preformed sleeve and is inserted in the annular space. When the annular space has a cylindrical shape, the sleeve-like damping element can be prefabricated in tubular shape so as to be cut to length then in accordance with the mounting situation.

An improved assembly is resulting when the walls of the annular space are conical. Thus in an especially simple manner an axial joining of the components forming the annular space can be achieved. In this case the damping element is shaped as sleeve having a corresponding course of the wall thickness.

Further advantages and advantageous developments of the invention are resulting from the subclaims and the description.

BRIEF DESCRIPTION OF THE DRAWINGS

The invention shall be illustrated in detail in the following description and drawing, the latter showing in FIG. 1 the basic structure of a belt retractor in a perspective view, FIG. 2 a first embodiment of the force limiter in a longitudinal section, FIG. 3 a second embodiment of the force limiter in a longitudinal section.

DESCRIPTION OF EXEMPLARY EMBODIMENTS

Figure 1:
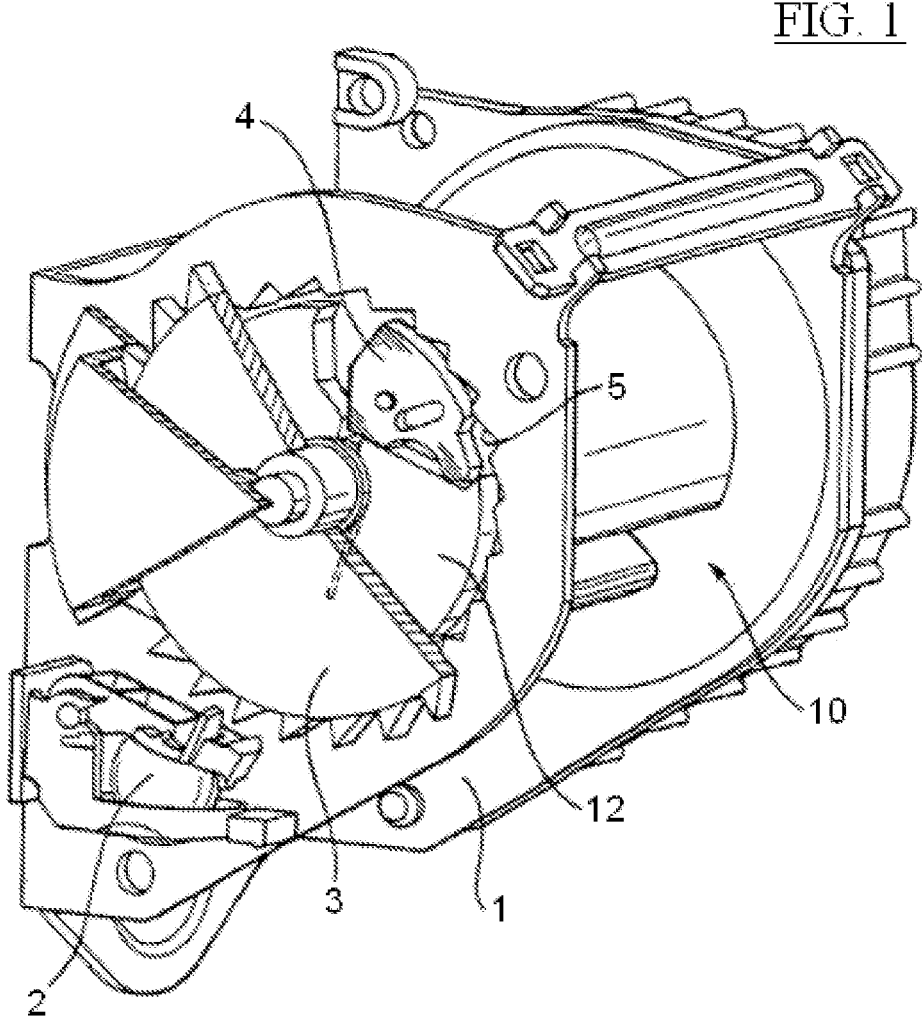

In FIG. 1 in a perspective, partly cut view the basic structure of a belt retractor including a force limiter according to the invention is shown. A belt reel 10 is rotatably supported in a frame 1. At said frame a sensor 2 is mounted for vehicle-sensitive actuation of a blocking unit 11. The blocking unit 11 includes a control disk 3 adapted to perform a rotation relative to the belt reel 10. A pawl 4 which is pivoted in a blocking disk 12 is coupled to the control disk 3. When the pawl 4 is swiveled out of its idle position into a blocking position, it engages in a toothing 5 in the frame 1 of the belt retractor. In this state the blocking disk 12 is supported on the frame 1 in a torque-proof manner.

Figure 2:
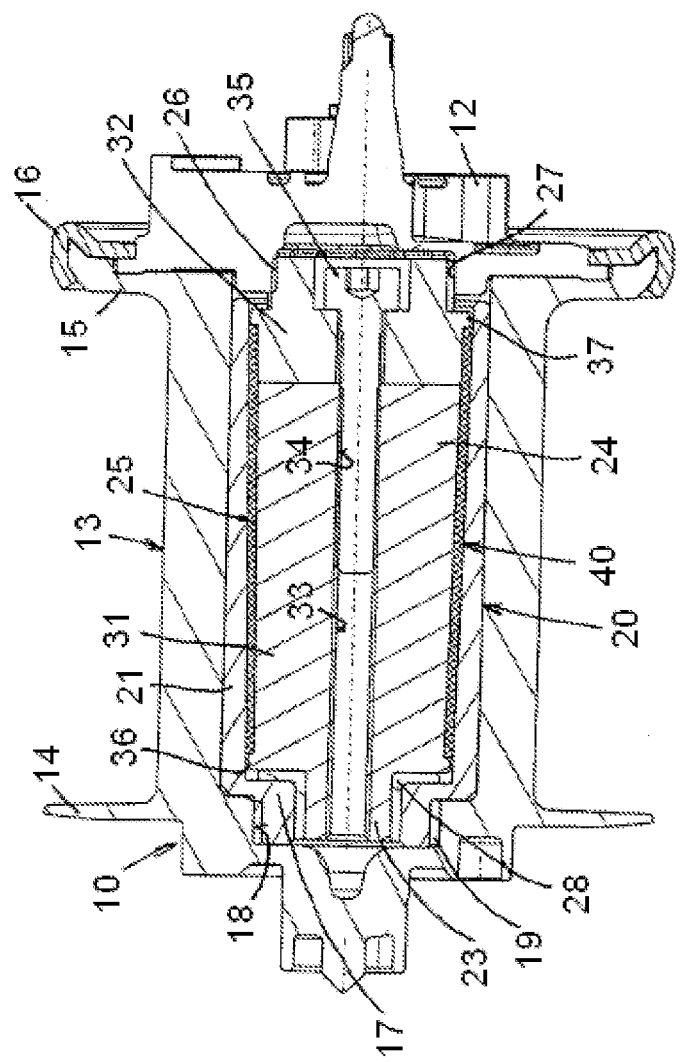

The belt reel 10 includes a cylindrical reel body 13 provided with two flanges 14 and 15. Between two flanges 14, 15 a seat belt can be received on the reel body. For fixing the blocking disk 12 at the reel body 13 a support ring 16 shown in FIGS. 2 and 3 is provided which encompasses the outer edge of both the flange 15 and the blocking disk 12. The blocking disk is fixedly held at the reel body 13 in axial direction by said support ring, while simultaneously torsion of the blocking disk 12 against the belt reel is permitted after a clamping force generated by the biasing of the support ring is exceeded.

As it is visible in the longitudinal section across the belt reel 10 shown in FIG. 2, the reel body 13 has a hollow-cylindrical shape. The front face of the reel body facing the blocking disk 12 has an open configuration; the opposite side is in the form of a closed wall 17. In the wall 17 a toothing 18 open toward the open cavity of the reel body 13 is formed. A front-face toothing 19 of a force limiter 20 engages in said toothing 18. The force limiter 20 is formed in this embodiment as a closed separate structural unit having a cylindrical shape and as to its dimensions being adapted to the interior of the reel body. The force limiter includes an external hollow-cylindrical outer shaft 21 provided with the toothing 19 at its one front face. In the front face of the outer shaft 21 provided with the toothing 19 a centric bore 22 is formed which serves for receiving a front-face pin 23 of an inner shaft 24. An annular space 25 is formed between the outer periphery of the inner shaft 24 and the inner periphery of the outer shaft 21.

The inner shaft 24 is provided at its front face opposed to the pin 23 with a toothing 26 that engages in a corresponding toothing 27 of the blocking disk 12. The inner shaft and the blocking disk are interconnected in a torque-proof manner via said toothings 26 and 27, resp., while simultaneously the outer shaft 21 is connected to the belt reel in a torque-proof manner via the toothings 18 and 19. Between the pin 23 of the inner shaft and the wall and the bore 22 a slide bearing 28 is arranged which rotatably supports the inner shaft 24 through the pin 23 in the bore 22 and simultaneously constitutes an axial bearing between the front walls of the inner shaft and the outer shaft facing each other.

The inner shaft 24 is designed in two pieces in this embodiment and consists of two cylinder portions 31 and 32 joined at the front face. The two cylinder portions include centric bores 33 and 34 being in alignment and are screwed to each other in a torsion-proof manner by means of a clamping screw 35 screwed into the bore.

The cylinder portion 31 provided with the pin 23 has at said front face a peripheral flange 36 the outer diameter of which is slightly smaller than the inner diameter of the outer shaft 21. The second cylinder portion 32 likewise exhibits at its front face facing the blocking disk a peripheral flange 37 the outer diameter of which is likewise slightly smaller than the inner diameter of the outer shaft 21.

The annular space 25 between the inner shaft 24 and the outer shaft 21 is filled with a sleeve-like damping element 40 between the two flanges 36 and 37 of the inner shaft. Said damping element consists of a cross-linked polymer, especially silicone, and is in the form of a hollow-cylindrical tubular solid or elastomer, respectively. The flexible and elastic damping element 40 is in full surface contact both with the outside of the inner shaft 24 and with the inside of the outer shaft 21, i.e. its wall thickness corresponds to the height of the annular space 25.

If in a load case, when the blocking unit is actuated, the blocking disk 12 is fixed in a torque-proof manner in the housing of the belt retractor and simultaneously a force is applied to the belt reel 10 via the belt strap in the pull-off direction, a relative torsion of the belt reel and thus of the outer shaft 21 occurs with respect to the blocking disk 12 and thus the inner shaft 24. The damping element adhering to the neighboring inner and outer peripheral walls of the outer shaft and the inner shaft is sheared by the relative torsion of the annular space walls. By this shearing load of the damping element the cross-links of the polymer are partly separated, whereby the strength thereof starts decreasing. Upon progressive load further cross-links are separated, whereby a degressive force path is formed. If in the case of progressive relative torsion a high degree of shearing is reached, an approximately constant basic level of the strength of the damping element is brought about. The force progression and the force-path progression, resp., of the damping and force limiting operation accordingly shows a relatively steep rise to a high initial force, after that a degressive force path with a decrease to a largely constant basic level.

The connection between the damping element and the adjacent annular space walls is performed in the embodiment shown here in a purely force-fit manner, i.e. by means of adhesion. It is also possible, however, to provide the inner wall of the outer shaft and the outer wall of the inner shaft, respectively, with bridges or projections interacting with corresponding recesses in the sleeve-like damping element and thus permitting a particular form closure at least at the beginning of the force limiting and/or damping operation.

In such configuration of the force limiter the sleeve-like shape of the damping element results in a very compact structure. The length of the sleeve-like damping element in this example amounts to approx. 42 mm, but it can also vary within the range of from 35 to 45 mm. The inner diameter is 19 mm in this case, while the outer diameter is 21 mm. Modifications having inner diameters of up to 15 mm and outer diameters of up to 24 mm are possible to permit the usability in a belt reel having conventional outer dimensions. Also, variations of the wall thickness within a range between approx. 1 mm and 2 mm are possible.

In the embodiment shown here the force limiter 20 is a closed unit to be inserted into the belt reel. It is also possible, however, to use, instead of the outer shaft 21, directly the inner wall of the reel body as contacting surface for the damping element and thus to dispense with the outer shaft.

The length of the damping element 40 is slightly larger than the distance of the two flanges 36 and 37 in the clamped state of the two cylinder portions 31, 32 of the inner shaft 24. In this way the sleeve-like damping element is slightly upset upon bracing the two cylinder portions, which results in an improved contact with the outer wall of the inner shaft and the inner wall of the outer shaft, respectively. In this embodiment the sleeve-like damping element is upset by approx. 1 mm and is thus biased. Dependent on the geometry of the damping element, also other magnitudes of clamping and/or biasing are possible.

It is also possible to form the inner shaft and the blocking disk in one piece so as to reduce the number of parts.

The second embodiment shown in FIG. 3 substantially differs from the one described above by geometrical adaptations permitting a facilitated assembly.

Also in this case the force limiter 20 is in the form of a subassembly to be separately inserted. The inner wall of the outer shaft 21A has a conical design in this embodiment so that the diameter of the interior increases toward the open front face and toward the blocking disk 12, respectively. The inner shaft 24A has a similar conical design, the outer diameter thereof continuously decreasing in the direction of the pin 23. The conical angle of the inner shaft can be as large as the conical angle of the outer shaft 21A, whereby an annular gap having a constant thickness is formed. However, it is also possible to design the conical angles of the inner and outer shafts differently so as to obtain an annular gap having a different gap height.

The two cylinder portions 31A and 32A are not braced by means of a clamping screw but at their contacting front faces have corresponding toothings not illustrated in detail here that ensure a torsion-proof connection. The axial bracing of the two cylinder portions is effectuated through the blocking disk 12 and the clamping force of the support ring 16 in this case.

The invention claimed is:

1. A belt retractor comprising a belt reel (10) rotatably supported in a frame (1), a blocking unit (11) counteracting a rotation of the belt reel and comprising a force limiter (20) between the belt reel and the blocking unit which permits a rotation of the belt reel relative to the blocking unit under load, the force limiter (20) including a damping element (40) that damps relative rotation between the belt reel and the blocking unit, the damping element (40) including a cross-linked polymer that is sheared under load, the damping element (40) being arranged in an annular space (25) inside the belt reel (10).

2. The belt retractor according to claim 1, wherein the damping element (40) is provided within a temperature range between −35° C. and +85° C. as elastic flexible solid.

3. The belt retractor according to claim 1, wherein the damping element (40) is in the form of a flexible elastic molded body.

4. The belt retractor according to claim 1, wherein the damping element (40) consists of a silicone material.

5. The belt retractor according to claim 1, wherein the force limiter (20) is in the form of a closed separate structural unit.

6. The belt retractor according claim 1, wherein the damping element is biased in the load case.

7. The belt retractor according to claim 1, wherein the cross-linked polymer transfers rotational force between the belt reel and the blocking unit.

8. The belt retractor according to claim 1, wherein the damping element is manufactured as a preformed sleeve.

9. The belt retractor according to claim 1, wherein the belt reel is connected to a first shaft and the blocking unit is connected to a second shaft, the first shaft rotating relative to the second shaft when the belt reel rotates relative to the blocking unit, the cross-linked polymer transferring rotational force between the first shaft and the second shaft.

10. The belt retractor according to claim 9, wherein the cross-linked polymer is in contact with the first shaft and the second shaft when the belt retractor is free from load.

11. The belt retractor according to claim 9, wherein one of the first shaft and the second shaft is substantially conical shaped along an entire length of the one of the first shaft and the second shaft.

12. A belt retractor comprising:
a belt reel rotatably supported in a frame;
a blocking unit preventing a rotation of the belt reel relative to the frame;
a force limiter including a damping element, the damping element transferring force between the belt reel and the blocking unit, the damping element having a cross-linked polymer that shears when the belt retractor is subjected to a load to damp a relative rotation between the belt reel and the blocking unit.

13. The belt retractor according to claim 12, wherein the damping element is in the form of a flexible elastic molded body.

14. The belt retractor according to claim 12, wherein the belt reel is connected to a first shaft and the blocking unit is connected to a second shaft, the first shaft rotating relative to the second shaft when the belt reel rotates relative to the blocking unit, the cross-linked polymer transferring rotational force between the first shaft and the second shaft, the cross-linked polymer being located in an annular space between the first and second shafts and in contact with the first and second shafts when the belt retractor is free from load.

* * * * *